Patented Oct. 9, 1945

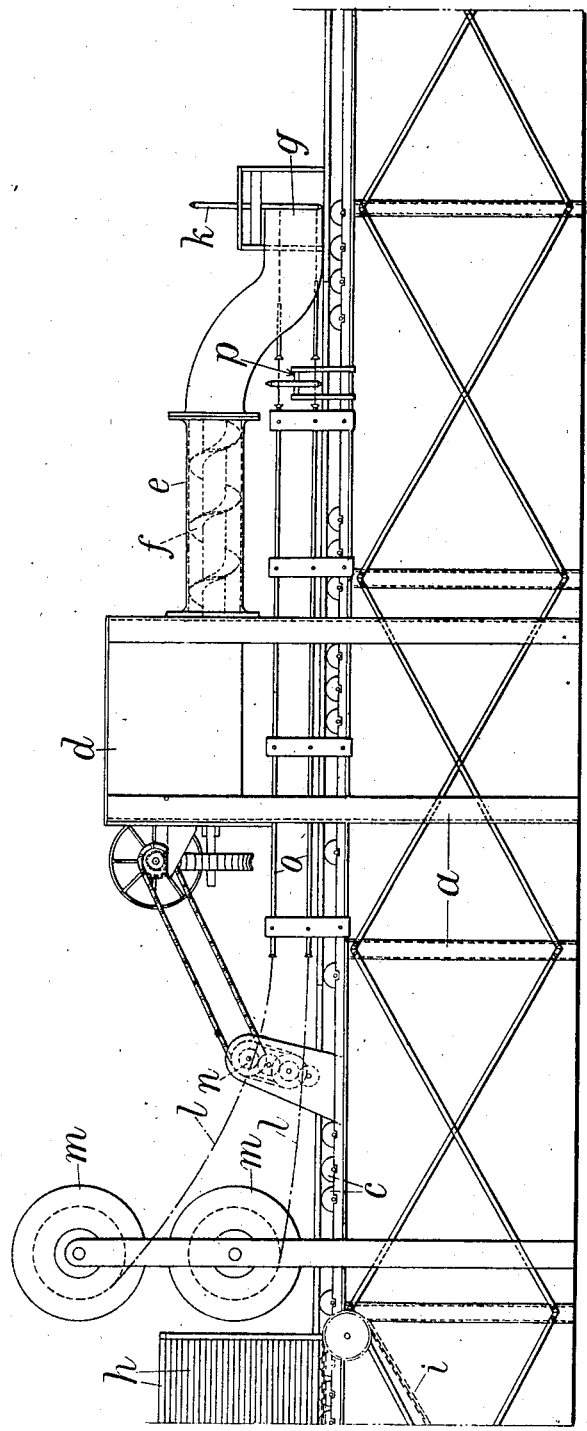

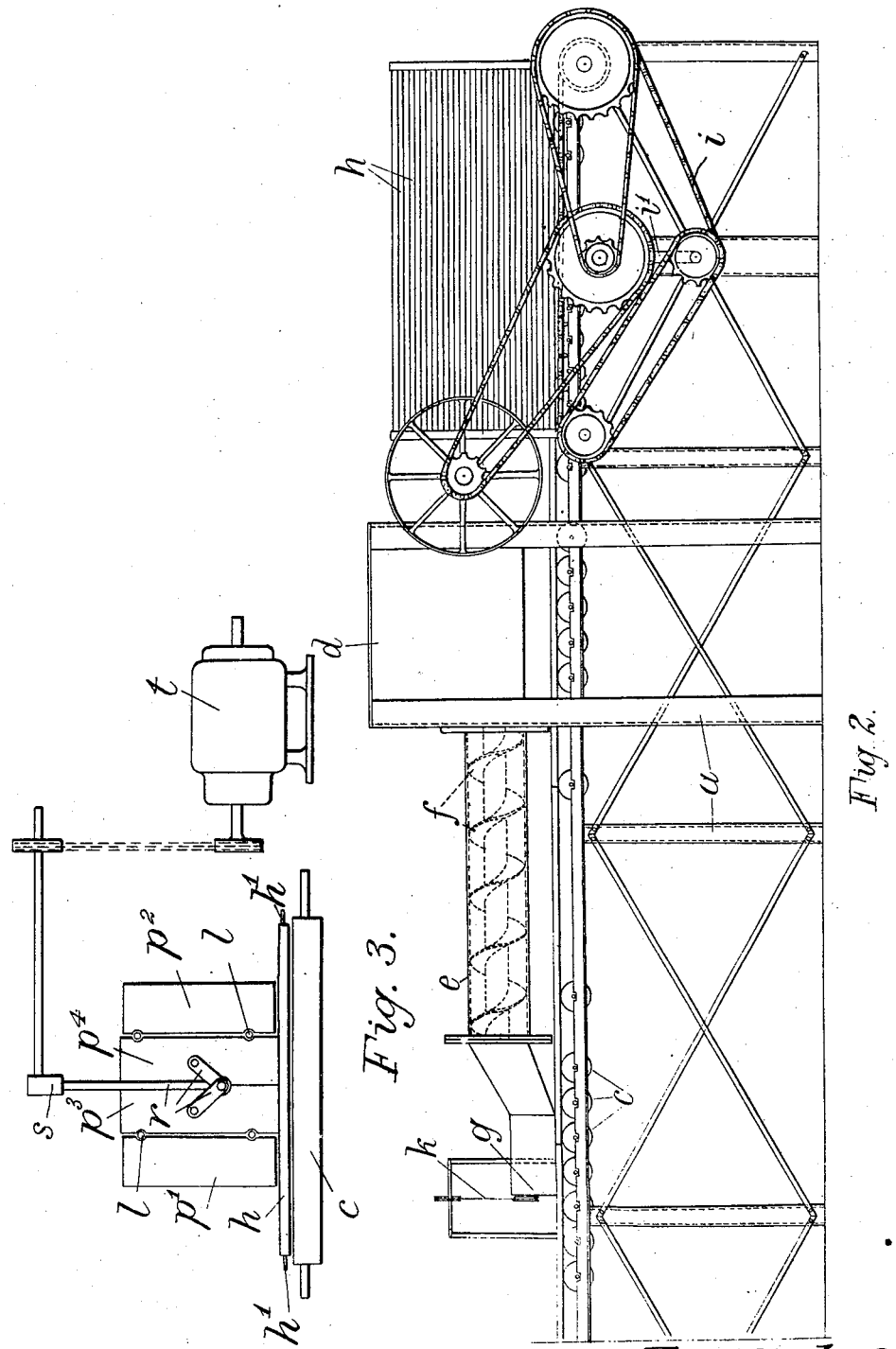

2,386,665

UNITED STATES PATENT OFFICE 2,386,665

EXTRUSION APPARATUS FOR MOLDING BLOCKS, TUBES, AND THE LIKE

William Alphonse de Vigier, Northwood, England, assignor of one-half to Acrow (Engineers) Limited, Northwood, Middlesex, England Application December 20, 1943, Serial No. 515,014
In Great Britain December 7, 1942

4 Claims. (Cl. 25—14)

This invention relates to the production of concrete blocks, tubes, or other units, bricks, or like elements formed from a plastic, pasty, or semi-liquid aggregate or material adapted to set after drying in air, heating or other treatment, and with or without steel wire or other reinforcement.

The object of the present invention is to provide improved means for producing such articles by extrusion through appropriately shaped nozzles, and the invention consists in apparatus for the purposes referred to comprising in combination a nozzle shaped to the cross-section of the article or element to be formed, means for extruding the material through the nozzle, a pallet or like support on to which the element is extruded, and means governed by the pallet for cutting the element to required length.

The invention also consists in apparatus according to the preceding paragraph having means for feeding reinforcement into the element during the extruding operation.

The invention also consists in apparatus according to the preceding paragraph, in which the reinforcement is fed from a continuous length, or lengths, and is cut to the required dimension by means, the operation of which is also governed by the pallet.

The invention also consists in apparatus according to any one of the three preceding paragraphs having a stack of pallets and means for feeding the same in succession to a conveyor by which they are carried beneath the extruding nozzle.

Further features of the invention will be apparent from the description given hereafter.

The accompanying drawings illustrate two modes of carrying out the invention.

Figure 1 is a more or less diagrammatic side elevation of one form of machine in accordance with the invention.

Figure 2 is a similar view of a second form of machine in accordance with the invention, and Figure 3 is a view of a cutter mechanism employed with the machine of Figure 1.

In carrying my invention into effect in one convenient manner as, for example, in its application to the production of reinforced concrete blocks and as illustrated in Figure 1, I form my improved machine with any suitable framework or foundation $a$ upon which I mount a conveyor, which may comprise, for example, a number of rollers $c$ mounted on the frame, or other convenient supports.

In a convenient position on the frame I mount a mechanical hopper $d$ in which the concrete material is mixed and stored and from the hopper there is an outlet tube $e$ having a worm $f$ or other extruding means serving to feed the material to a nozzle $g$ arranged just above the conveyor. The cross-section of the nozzle and its dimensions correspond with the cross-section and dimensions of the block that is to be formed. The mechanical hopper, extruder, and conveyor may all be operated from a single main drive by suitable transmission or they may be driven separately as desired.

At the end of the machine remote from the nozzle I arrange a stack of steel pallets $h$ or other supports, the length of each of which corresponds to the length of the element to be formed and suitable means are provided for feeding the pallets in succession to the conveyor; for example, beneath the pallets and on each side of the machine I arrange a chain $i$, each of the chains having spade lugs or like projections (not shown) inserted therein at a distance apart corresponding to the length of a pallet, while the length of a chain is a multiple of the length of the pallet, it being understood that the tensioning of the chains may be adjusted by means of a jockey pulley or pulleys $i'$ (Figure 2), while the chains may be lengthened or shortened as required by adding or subtracting links. By way of example, if it is required to make a concrete block 3 feet long the spade lugs will be spaced 3 feet apart and the length of the chains will be a multiple of 3 feet.

As the chains travel horizontally beneath the stack of pallets in a forward direction the spade lugs contact with handles or the like $h'$ (Figure 3) on the lowermost pallet thus abstracting the latter from the bottom of the stack and feeding it to the conveyor whereupon the pallets in the magazine drop down and another pair of spade lugs immediately contact with the handles on the next pallet and so on, the cycle of operations continuing as long as there are pallets in the magazine. The handles with which each pallet is furnished not only provide means for facilitating abstraction of a pallet from the magazine in the manner above described and enable a pallet with a finished block thereon to be readily carried away from the machine but they also serve another important function in that they govern the timing of essential operations of the machine; for example, since the machine is to produce a succession of blocks from a continuously extruded length of material it is clear that I must provide suitable means for cutting the extruded length according to the dimension of the individual block. The cutting mechanism $k$ may be in the form of a wire cutter, revolving circular blade, a reciprocating or shearing blade, or of other suitable form and its operation at the appropriate time to secure the required length of finished block is governed by suitable trip mechanism actuated by a handle on the pallet for the time being in use (or it may be another pallet).

When the machine is required to produce a reinforced concrete block it may be provided with a hopper containing a plurality of bars of the right length with suitable means for feeding the same in appropriate position to the extruding nozzle $g$ but preferably I arrange for the steel or other reinforcing wire $l$ to be carried in continuous lengths upon a plurality of drums $m$ rotatably carried by the frame of the machine, the number of drums being determined by the number of separate reinforcements required in a particular block.

The wires will be fed by feed rollers $n$ or otherwise to tubular guides $o$ positioned in space in correct relation to the extruding nozzle opening as determined by the position which the wires are to occupy in the finished block.

I also provide any convenient form of mechanism for cutting the reinforcements into the proper lengths, the cutting mechanism indicated generally at $p$ in Figure 1, for example, comprising a revolving abrasive wheel, a rotary or reciprocating saw, toggle actuated shear blades, or other suitable means.

In one particular construction, adapted for the cutting of, say, four reinforcement wires and shown in Figure 3, I provide two fixed blades $p'$, $p^2$, each with a semi-circular recess in its inner edge, and between them two movable blades $p^3$, $p^4$, with corresponding semi-circular recesses adapted to take the reinforcing bars $l$, the movable blades being operated, from example, by toggle link mechanism $r$ actuated by an eccentric $s$ and driven from a suitable electric motor $t$.

In the case of the reinforcement cutter also the timing of its operation is governed by the pallet; thus at the moment when it is desired to cut off the reinforcing bars the pallet will have passed partly under the nozzle of the extruder and the reinforcing bars will be embedded in the concrete unit being extruded. The handle of the pallet trips a lever to switch on the motor operating the cutter whereupon the semi-circular grooves in the shear blades close on the steel bars to cut the same. Normally the cutting operation will occupy a certain period of time and the cutter with its drive is therefore conveniently made as a self-contained unit mounted on the machine on guide bars or in V grooves after the manner, for example, of a lathe saddle. Thus when the blades close on the reinforcing bars the cutting element is carried along with the bars until such time as the reinforcing wires are cut through and the shear blades again open. When the blades thus open a limit switch is automatically operated to break the motor circuit so that the motor stops and a spring or counterweight serves to return the cutter to its normal position, the following reinforcements being then able freely to pass through the separated semi-circular openings in the cutter blades. The cutter is then ready to repeat the operation when the next pallet arrives in position beneath the extruding nozzle, the handles of the successive pallets governing the timing of the cutter in the manner above described. Normally this timing will be such that the length of the reinforcing bars will be slightly less than the length of a finished block so that the ends of the bars will be inset somewhat from the ends of the block.

If it be assumed that a solid rectangular block of concrete having a cross-sectional area of 120 square inches can be extruded from the machine at the rate of 5 seconds per foot length then it would be possible without altering the speed of the extruding worm to extrude a block of half the area at twice the speed, in which case the rate of travel of the pallets would have to be doubled. For many reasons, however, it is not usually desirable to increase the extruding speed beyond certain limits and when making complicated shapes or cored blocks it is desirable to reduce the speed of the extrusion worm, and to enable the necessary adjustments to be readily made I preferably provide some form of infinitely variable speed gear in the drive having a range, say, of 50% above and below the normal speed of travel which may, for example, be 12 feet per minute, or at any other desired rate. By means of the arrangements provided, therefore, the rate of extrusion to the speed of travel of the pallets can be readily adjusted to any desired ratio.

It will be understood that the foregoing details of construction have been given purely by way of example to indicate the nature of the invention and not to limit its scope and numerous modifications will suggest themselves to those skilled in the art and are to be considered as included within the ambit of the protection sought; for example, the extruding nozzle may be divided by partitions or may otherwise be subdivided when it is required to extrude a plurality of units or elements simultaneously. Moreover, any suitable means may be adopted for adjusting the length of the pallets and the feeding arrangements associated therewith to suit varying lengths of units or elements to be formed. Further, the worm or other extruding device may be arranged horizontally or at any suitable inclination to the horizontal and in some cases the extruding device may be arranged in the hopper instead of being separate therefrom as above described.

Again, although I have described a machine in which the length of the pallet is equal to the length of the unit to be formed, this is not essential, as one size of pallet may be used for a shorter unit, or a plurality of shorter units. For example, the pallet may be provided with a plurality of trip lugs at spaced intervals in its length and of varying operative lengths to register on the various attachments at given intervals, the cutting arrangement or arrangements being designed to meet such conditions.

Figure 2 shows a form of machine for making articles not requiring reinforcing, and as it is similar in construction to that shown in Figure 1, and as like parts in the two figures are indicated by similar reference characters, it is not thought that any detailed description of this form of machine is necessary.

I claim:

1. An apparatus of the character described comprising in combination a frame work provided with a guideway, a nozzle shaped to the cross section of the article to be formed mounted on the frame work above the guideway, a hopper at the rear end of the guideway, a stack of pallets within the hopper, means for continuously feeding the lower-most pallets from the bottom of the stack in end abutting relation to the guideway to effect continuous movement of the pallets beneath the nozzle, and means governed by the pallet for cutting the material extruded from the nozzle to the required length.

2. An apparatus as claimed in claim 1 wherein means are provided for feeding reinforcements into the extruded material during the extruding operation.

3. An apparatus as claimed in claim 1 in which means is provided for feeding reinforcements into the material during the extruding operation, said reinforcements being fed from a continuous length and cut to the required dimension by means the operation of which is also governed by the pallet.

4. An apparatus according to claim 1 in which means are provided for feeding reinforcements into the material during extruding operation, and means for cutting the reinforcements into predetermined lengths determined by the length of the pallet, the said cutting means being arranged to travel with the pallet carrying the article of which the reinforcement is to be cut, and means for returning the cutting means to its normal position.

WILLIAM ALPHONSE DE VIGIER.